United States Patent Office 3,468,669
Patented Sept. 23, 1969

3,468,669
METHOD OF MANUFACTURING A PROTEIN FOOD PRODUCT
Robert A. Boyer and Arthur A. Schulz, St. Louis County, and Edmond A. Schatzman, St. Louis, Mo., assignors to Ralston Purina Company, St. Louis, Mo., a corporation of Missouri
No Drawing. Continuation-in-part of application Ser. No. 168,807, Jan. 25, 1962. This application Oct. 23, 1965, Ser. No. 504,098
Int. Cl. A23j 1/14, 1/22
U.S. Cl. 99—17                                  4 Claims

ABSTRACT OF THE DISCLOSURE

Spun protein food products are produced by adding sulfite compounds to the alkaline protein solution prior to spinning and to the acid solution after spinning to provide products of improved overall quality.

---

This application is a continuation-in-part of our co-pending application Ser. No. 168,807, filed Jan. 25, 1962 now abandoned.

This invention relates to a method of manufacturing a protein food product and more specifically to the preparation of a product which is an improvement over those disclosed in U.S. Patents 2,682,466, 2,730,447 and 2,730,448.

Briefly, the present invention prepares an improved product by mixing a sulfite, other sulfur dioxide producing material or sulfur dioxide itself, with an edible protein to improve the flavor and texture of the product and to facilitate its preparation.

Among the several objects of this invention are the preparation of an edible protein product in filament form having improved flavor; the preparation of such a product which breaks without rubberyness; the provision of an improved method for preparing synthetic food products from edible proteins; and a product of the type indicated which can be more easily prepared. Other objects will be in part apparent and in part pointed out hereinafter.

The invention accordingly comprises the methods hereinafter described, the scope of the invention being indicated in the following claims.

While valuable edible protein products can be prepared utilizing the teachings of U.S. Patents 2,682,466, 2,730,447 and 2,730,448, these products may possess sufficient rubberyness so that they cannot be masticated in the same way that natural meat products are masticated, for example, and the flavor thereof often possesses undesired characteristics. In addition, the spinning solution possesses a higher viscosity in operation than is preferred. It has been found in accordance with the present invention that all of these disadvantages can be overcome and additional advantageous results secured if the protein is treated with a sulfite or other sulfur dioxide providing agent during the process of preparing edible protein products.

The treatment of the edible protein with the sulfur dioxide providing agent, such as a sulfite, may take place at various stages of the production. For example, the sulfite may be mixed with the dry protein or the wet protein curd prior to formation of the spinning solution, it may be added to the spinning solution, it may be added to the coagulating bath or it may be added to a supplemental bath employed after the coagulating bath. In all instances some of the advantages summarized above are secured. If desired, the sulfite treatment may be applied to the protein at more than one location. The sulfite may be formed in situ in addition to or in lieu of adding it as such.

Either sodium sulfite, potassium sulfite or ammonium sulfite, or mixtures of two or more of the foregoing, may be utilized. Other sulfites useful in carrying out the present invention are those known as hyposulfites, hydrosulfites, bisulfites and metabisulfites exemplified by the sodium salts of these various sulfites. Sulfites other than sodium sulfite may likewise be employed as long as they form sulfur dioxide in solution. If preferred, sulfur dioxide per se or sulfurous acid may be utilized in carrying out the invention.

In order to secure the advantages of the present invention, not substantially less than 0.25% sodium sulfite equivalence by weight of the dry protein should be employed. Higher proportions of sulfite may be utilized if desired but the proportion should not be increased to the point where the protein spinning solution tends to set up to gel form. In this connection 1.5% of sulfite gives excellent results while 16% of sodium sulfite causes the spinning solution to set up to gel form. If sulfur dioxide or a sulfur dioxide producing material other than a sulfite is employed, the amount added to the protein is preferably between as few as 200 and 10,000 p.p.m. $SO_2$ based upon the dry protein.

Utilizing the process of the present invention, it is found that the following advantageous results are secured. The flavor of the edible protein product has been unexpectedly improved and it has a more desirable structure. Specifically the structure of the product causes it to break without rubberyness when chewed so that the product has the tenderness desired for meat products. Whether the sulfite is mixed with the original protein or is added to the spinning solution, the viscosity of the spinning solution is lowered, thereby lowering power consumption and increasing the protein level which can be utilized. Finally, the protein product of the present invention exhibits increased resistance to bacterial and fungal growth.

The following examples illustrate the invention:

Example 1

Edible soy protein which has been isolated at the isoelectric point is spray dried. To the dry product is added 1.5% by weight of sodium sulfite. The combination is then dispersed in an aqueous solution at 80° F. so that the solution contains 14.6% total dry solids. The solution is agitated and sodium hydroxide is added at a rate of 7% of the weight of the dry protein. The combination is mixed until all of the protein is dissolved.

The solution of protein and sulfite in the sodium hydroxide solution is then spun into filaments using a spinneret in the manner described in U.S. Patent 2,682,466. After spinning, the filaments are formed into bundles to consistute "tows" of filaments and subsequently processed as taught in Patent 2,682,466. Among the additives which may be incorporated are binders, flavoring materials, coloring materials, oils, fats, emulsifiers and mixtures thereof.

The protein product formed has an improved flavor and structure over a product formed in the same manner but without the sulfite and, when chewed, provides the effect of tenderness. In addition the viscosity of the spinning solution is lower than if no sulfite were included. The product exhibits increased resistance to bacterial and fungal growth.

Example 2

Example 1 is repeated except that the sodium sulfite is added to the wet soy protein curd. The combination is used directly in the wet state by adjusting to a level of 14.3% total dry solids. The subsequent processing steps are the same and the product secured possesses the same advantageous properties.

Example 3

Example 1 is repeated except that the sodium sulfite is replaced with an equivalent amount of ammonium sulfite. The processing steps employed are the same and the product secured possesses the same advantageous properties.

Example 4

Example 1 is repeated except that the sodium sulfite is replaced with an equivalent amount of sodium hydrosulfite. The processing steps employed are the same and the product secured possesses the same advantageous properties.

Example 5

An alkaline solution of dispersed soy protein is gradually raised to 100° F. The solution is then spun, using the technique of U.S. Patent 2,682,466, through spinneret openings into a bath containing acetic acid and sodium chloride. The filaments are taken from the bath in the form of "tows" and stretched in the manner described in said U.S. Patent 2,682,466. Although a degree of orientation is brought about by alignment of the protein molecules as the solution passes through the extrusion orifice, further orientation is obtained by the stretching. A stretching procedure involving no more than leading the fibers away from the extrusion orifice at a rate of speed sufficiently great to prevent the fibers from being formed in a kinky condition enhances the orientation, and consequently the strength. The "tows" are then passed into a sulfite solution made up in acetic acid and sodium chloride containing approximately 1% by weight of sodium sulfite. After holding overnight at room temperature and treating further in the manner outlined in U.S. Patent 2,682,466, the protein product has all of the valuable properties set forth in Example 1.

Example 6

Example 1 is repeated but in addition, after the "tows" are removed from the coagulating bath, they are further treated in a sulfite bath as in Example 5. After subsequent treatment in the manner outlined in U.S. Patent 2,682,466, the protein product has all of the valuable properties set forth in Example 1, but to a maximum degree very closely approaching the structure of natural meat products which are or have been tenderized to a preferred state.

Example 7

Example 5 is repeated but the sulfite solution contains aproximately 5% by weight of sodium sulfite. Similar results are secured.

Example 8

Dry edible casein protein is dispersed in an aqueous solution at 100° F. so that the solution contains 24% dry solids. The solution is agitated and 2.5% sodium hydroxide and 2% sodium sulfite, both amounts calculated on the weight of dry protein, are added. The combination is mixed until all of the protein is dissolved.

The solution of protein and sulfite in the sodium hydroxide solution is then spun into filaments using a spinneret in the manner described in U.S. Patent 2,682,466. After spinning, the filaments are formed into bundles to constitute "tows" of filaments and subsequently processed as taught in Patent 2,682,466.

The protein product formed has an improved flavor and structure over a product formed in the same manner but without the sulfite and, when chewed, provides the effect of tenderness. In addition, the viscosity of the spinning solution is lower than if no sulfite were included. The product exhibits increased resistance to bacterial and fungal growth.

Example 9

A spinning solution which includes water, 18% by weight soy protein and 7% by weight sodium hydroxide, which has a viscosity of about 20,000 cps. and which is at a temperature of 105° F., was used to prepare fibers. The solution was forced through a rayon spinneret having 5,000 holes (average diameter of 0.004 inch) into a coagulating bath composed of water containing 10% sodium chloride and 1.5% lactic acid. The precipitating bath contained sufficient sulfur dioxide so that as removed from the bath the fibers, containing about 65% water, had an $SO_2$ content of about 1,000 p.p.m. The tow of precipitated fibers was taken out of the bath by means of a take-away reel adjusted so that stretch of 100–200% was exerted on the fibers. The fibers were then washed with water to remove excess acid and to raise the pH of the fibers to about 5.0. Analysis of the fibers before the water washing showed a peroxide No. of 0.0 (milliequivalents of oxygen per 1,000 g. of total sample).

The fibers were very bland and after impregnation with suitable binding and flavoring agents, represented a simulated meat product which was of superior quality, free from objectionable flavors and which had, when chewed, the effect of tenderness.

Although the pH of the fibers is preferably adjusted to between 5.0 and 6.4, it may be within the range of about 4.0 to about 7.0, if desired.

Example 10

One hundred grams (aged for about 24 hours) of the fibers of Example 9 (containing about 65% by weight water) were impregnated with the following ingredients and amounts:

| | | |
|---|---|---|
| Egg albumen | g | 20.0 |
| Flour | g | 10.0 |
| Non-fat milk solids | g | 10.0 |
| NaCl | g | 8.0 |
| Yellow onion powder | g | 1.0 |
| Mono-sodium glutamate | g | 0.5 |
| Red dye (2% aqueous solution) | ml | 1.5 |
| Water | ml | 150.0 |

After impregnation the fibers were placed in pans and baked for 30 minutes at 350° F. The simulated meat product was of excellent quality with no soy, beany or paint type flavor, was tender and could be readily masticated.

The simulated food product, after the described setting-up procedures, can be packaged and sold as such. However, it can be optionally treated in a variety of ways to provide specialized products. Thus, the treated tow can be cut into pieces or chunks of various sizes to simulate meat such as ham, chicken, tuna or other snack products. The product, either before or after said cutting, can be fried, smoked or dried. The dehydrated products can be readily rehydrated in boiling water. Such dehydrated products find use in gravies, soups, hot dishes and the like. The dehydration is preferably accomplished at temperatures of about 70–150° F.

In view of the above, it will be seen that several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for producing an edible protein product which comprises forming an alkaline solution containing dissolved protein, said solution containing at least about 0.25% by weight, based on the dry weight of the protein, of a sulfite containing composition to reduce the viscosity of the solution; precipitating the protein under spinning conditions to form protein filaments and subsequently contacting the resulting filaments with an acid solution containing at least about 0.25% by weight, based on the dry weight of the protein of a sulfite containing or sulfur dioxide producing composition.

2. The method according to claim 1 wherein the protein is soy protein.

3. The method according to claim 1 wherein the protein is casein.

4. The method according to claim 1 wherein the sulfite containing composition is present in the alkaline solution in an amount of about 1.5% by weight, based on the dry weight of the protein.

References Cited

UNITED STATES PATENTS

| | | | |
|---|---|---|---|
| 2,370,266 | 2/1945 | Smith et al. | 117—56 |
| 2,682,466 | 6/1954 | Boyer | 99—14 |
| 2,830,902 | 4/1958 | Auson et al. | 99—14 |
| 3,177,079 | 4/1965 | Kuramoto et al. | 99—14 X |

OTHER REFERENCES

Altschul: Processed Plant Protein Foodstuffs, Academic Press Inc., New York, 1958, pp. 403 to 404.

A. LOUIS MONACELL, Primary Examiner

H. H. KLARE III, Assistant Examiner

U.S. Cl. X.R.

99—14, 18, 20